(12) United States Patent
Huddleston et al.

(10) Patent No.: US 7,504,157 B2
(45) Date of Patent: Mar. 17, 2009

(54) STRONTIUM TITANIUM OXIDES AND ABRADABLE COATINGS MADE THEREFROM

(75) Inventors: James B. Huddleston, Galveston, TX (US); Raymond Zatorski, East Hampton, CT (US); Jean Mozolic, Wrentham, MA (US)

(73) Assignee: H.C. Starck GmbH, Goslar (DE)

( * ) Notice: Subject to any disclaimer, the term of this patent is extended or adjusted under 35 U.S.C. 154(b) by 277 days.

(21) Appl. No.: 11/264,868

(22) Filed: Nov. 2, 2005

(65) Prior Publication Data

US 2007/0098987 A1    May 3, 2007

(51) Int. Cl.
*B32B 9/00*    (2006.01)

(52) U.S. Cl. .............. 428/469; 428/701; 428/702; 501/136; 501/103; 501/104; 416/241 B; 416/241 R

(58) Field of Classification Search .......... 428/701, 428/702, 469; 416/241 B, 241 R; 501/134, 501/135, 136, 138, 139
See application file for complete search history.

(56) References Cited

U.S. PATENT DOCUMENTS

| | | | |
|---|---|---|---|
| 3,723,165 A | 3/1973 | Longo et al. | |
| 4,917,960 A | 4/1990 | Hornberger et al. | |
| 5,180,285 A * | 1/1993 | Lau ................... | 416/241 B |
| 5,196,471 A | 3/1993 | Rangaswamy et al. | |
| 5,434,210 A | 7/1995 | Rangaswamy et al. | |
| 5,506,055 A | 4/1996 | Dorfman et al. | |
| 5,530,050 A | 6/1996 | Rangaswamy | |
| 5,626,923 A | 5/1997 | Fitzgibbons et al. | |
| 5,705,231 A | 1/1998 | Nissley et al. | |
| 5,976,695 A | 11/1999 | Hajmrle et al. | |
| 5,977,004 A * | 11/1999 | Higashi et al. ............... | 501/135 |
| 5,993,976 A | 11/1999 | Sahoo et al. | |
| 6,159,267 A * | 12/2000 | Hampden-Smith et al. ..... | 75/252 |
| 6,207,297 B1 | 3/2001 | Sabol et al. | |
| 6,251,526 B1 | 6/2001 | Staub | |
| 6,254,704 B1 | 7/2001 | Laul et al. | |
| 6,316,100 B1 * | 11/2001 | Kodas et al. ................. | 428/357 |
| 6,365,274 B1 | 4/2002 | Scheckenbach et al. | |
| 6,365,281 B1 | 4/2002 | Subramanian et al. | |
| 6,503,576 B1 | 1/2003 | Russo et al. | |
| 6,602,553 B2 | 8/2003 | Heimberg et al. | |
| 6,686,060 B2 | 2/2004 | Bruce et al. | |
| 6,733,907 B2 | 5/2004 | Morrison et al. | |
| 6,808,756 B2 | 10/2004 | Hajmrle et al. | |
| 6,869,550 B2 | 3/2005 | Dorfman et al. | |
| 6,890,668 B2 | 5/2005 | Bruce et al. | |
| 2002/0190721 A1* | 12/2002 | Harrold et al. ............... | 324/454 |
| 2005/0003227 A1 | 1/2005 | Khan et al. | |
| 2005/0064225 A1 | 3/2005 | Lectercq et al. | |
| 2005/0129868 A1* | 6/2005 | Philip et al. .................. | 427/452 |

* cited by examiner

*Primary Examiner*—Timothy M Speer
(74) *Attorney, Agent, or Firm*—Connolly Bove Lodge & Hutz LLP

(57) ABSTRACT

Abradable coatings are provided. The coatings comprise SrTiO in combination with a ceramic, such as yttria stabilized zirconia, or SrTiO in combination with an MCrAlX, such as NiCoCrAlY. The abradable coatings are suitable for use in high temperature environments found in gas turbine engines. Also provided are metal articles coated with such coatings, and abradable assemblies.

26 Claims, 4 Drawing Sheets

STRONTIUM TITANIUM OXIDES AND ABRADABLE COATINGS MADE THEREFROM

FIELD OF THE INVENTION

The present invention relates to strontium titanium oxides and their use in coatings. Specifically, strontium titanium oxides can be used in ceramic or metal coatings to provide abradable coatings for gas turbine engines, turbochargers, compressors, steam turbines and the like.

BACKGROUND INFORMATION

Materials which abrade readily in a controlled fashion are used in a number of applications, including as abradable seals. Contact between a rotating part and a fixed abradable seal causes the abradable material to erode in a configuration which closely mates with and conforms to the moving part at the region of contact. In other words, the moving part wears away a portion of the abradable seal so that the seal takes on a geometry which precisely fits the moving part, i.e., a close clearance gap. This effectively forms a seal having an extremely close tolerance.

One particular application of abradable seals is their use in axial flow gas turbines. The rotating compressor or rotor of an axial flow gas turbine consists of a plurality of blades attached to a shaft which is mounted in a shroud. In operation, the shaft and blades rotate inside the shroud. The inner surface of the turbine shroud, in both the compressor section and the "hot" combustion section of the engine, is most preferably coated with an abradable material. The initial placement of the shaft and blade assembly in the shroud is such that the blade tips are as close as possible to the abradable coating.

As will be appreciated by those skilled in the art, it is important to reduce back flow in axial flow gas turbines to maximize turbine efficiency. This is achieved by minimizing the clearance between the blade tips and the inner wall of the shroud. As the turbine blades rotate, however, they expand somewhat due to centrifugal force. The tips of the rotating blades then contact the abradable material and carve precisely defined grooves in the coating without contacting the shroud itself. These grooves provide the exact clearance necessary to permit the blades to rotate at elevated temperatures and thus provide an essentially custom-fitted seal for the turbine.

In order for the turbine blades to cut grooves in the abradable coating, the material from which the coating is formed must abrade relatively easily without wearing down the blade tips. This requires a careful balance of materials in the coatings. In this environment, an abradable coating must also exhibit good resistance against particle erosion and other degradation at elevated temperatures.

Erosion resistance is necessary to maintain uniform clearances throughout the life of the engine or engine performance characteristics are adversely affected. Conventional commercial turbine engines have exhibited a two percent increase in airflow around blade tips as a result of seal erosion after approximately 3,000 flights. Much of this may be attributed to erosion of the abradable seal and blade airfoil tip, and to rub interactions between the blade tips and the seal. In military engine applications, where gas path velocities are relatively high, erosion resistance is of paramount importance.

There are several air seals used in a compressor section of a gas or aircraft engine. Historically the oldest is feltmetal, which comprises a plurality of metal fibers. Disadvantages of this seal include the fact that it has to be brazed to the substrate material and it is highly porous. A number of other abradable coatings have been proposed, including cellular or porous metallic structures; hard ceramics such as $ZrO_2$ and MgO; a metal matrix of aluminum-silicon with embedded polymer particles; or hexagonal boron nitride powder particles. The disadvantage of these latter coatings is their limited temperature capability at. 315° C. for the polymer coating and 480° C. for the hexagonal boron nitride coating.

Abradable materials used at high temperatures in the compressor section of turbine engines also include NiCrAl/Bentonite coatings and abradables such as the one described in U.S. Pat. No. 5,434,210, which discloses a composite powder for thermal spraying comprising three components, one of metal or ceramic matrix materials, a solid lubricant, and a polymer. Typical as-sprayed coatings comprise a Co alloy matrix with dispersed particles of hexagonal boron nitride and polymer. The polymer is subsequently burned out and the final very porous structure contains only hexagonal boron nitride particles dispersed throughout the Co-based matrix. The coatings prepared from this material have acceptable abradability but low erosion resistance.

The search for suitable materials for use in the compressor section of the turbine is a result of the problem of higher heat levels as stages approach the combustion chamber of the engine. Higher temperatures require higher service temperature materials. Materials that are sensitive to high temperature oxidation such as plastics, graphite or hexagonal boron nitride become fugitive materials above their service temperatures and leave only a weakened skeleton that is susceptible to high erosion or complete degradation and spallation. Other materials such as bentonite-containing material can change hardness and become abrasive at elevated temperatures.

Abradables used in the high temperature combustion section of the turbine have been developed by making thermal barrier coatings (TBC) porous. This has been achieved by incorporation of temperature degradable materials such as high temperature polymers, and/or the use of thermally sprayed hexagonal boron nitride, both of which provide a porous coating. The resulting coating is either heat treated to decompose the degradable material or it is burned out during operation of the turbine. The problem with these materials is that the resulting porous coating lacks mechanical strength, which causes the coatings to fail structurally after periods of thermal cycling. This makes the coating useless for dimensional control and dangerous to the structural integrity of the turbine section due to destruction of the. TBC. There remains a need for thermally stable abradable coatings for use in high temperature environments that provide the desired level of erosion resistance, abradability and thermal stability.

SUMMARY OF THE INVENTION

In one aspect, the present invention provides a powder coating composition comprising strontium titanium oxide and a ceramic. In an additional aspect, the present invention provides a powder coating composition comprising strontium titanium oxide and one or more metals and/or metal alloys. In additional aspects, metal articles having these coatings are provided. In other aspects, an abradable seal assembly is provided, the assembly comprising a substrate and an abradable seal coating deposited on the substrate by thermal spraying. The abradable seal coating comprises i) strontium titanium oxide and a ceramic or ii) strontium titanium oxide and a metal and/or metal alloy.

These and other aspects of the present invention will be more readily apparent from the following drawings, detailed description and appended claims.

BRIEF DESCRIPTION OF THE DRAWINGS

The invention is further illustrated by the following drawings in which.

DETAILED DESCRIPTION OF PREFERRED EMBODIMENTS

As used herein, including the examples or unless otherwise expressly specified, all numbers may be read as if prefaced by the word "about", even if the term does not expressly appear. Also, any numerical range recited herein is intended to include all sub-ranges subsumed therein. As used herein, the term "polymer" refers to oligomers and both homopolymers and copolymers.

In one aspect, the present invention provides a coating composition comprising strontium titanium oxide and a ceramic. Ceramics are well known for their use as thermal barrier coatings in gas turbine engine environments. As used herein, the term "abradable ceramic" will refer to the SrTiO in combination with a ceramic.

Figure 1:
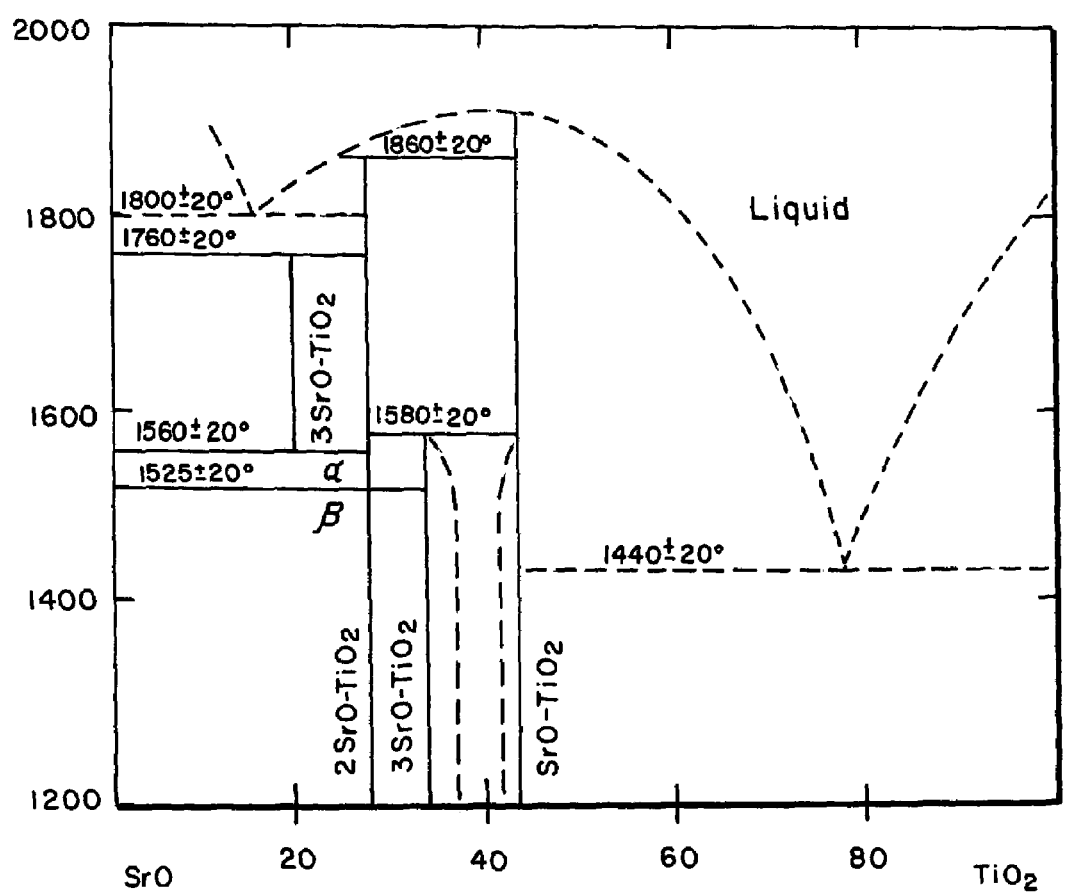
FIG. 1 is a phase diagram for $SrO$—$TiO_2$.

The strontium titanium oxide comprises 25-60 wt. % $Sr_2TiO_4$ and 75-40 wt. % $Sr_3Ti_2O_7$ and is available from Exotherm Corporation of Camden, N.J. As used herein, the terms "strontium titanium oxide" and "strontium titanate", used interchangeably, will refer to this mixture of oxides, and will be denoted by the specific formula $Sr_2TiO_4/Sr_3Ti_2O_7$ or the more general formula SrTiO. In one embodiment, the SrTiO is a mixed crystal comprising the two oxides. Also in a preferred embodiment, the strontium titanium oxide comprises 40-50 wt. % $Sr_2TiO_4$ and 60-50 wt. % $Sr_3Ti_2O_7$. The $Sr_2TiO_4/Sr_3Ti_2O_7$ used in the coatings of the present invention is remarkably stable over a wide range of temperatures, as can be seen in the phase diagram shown in FIG. 1. Thus, both the abradable ceramic coating and the abradable metal coating of the present invention (as defined and described further herein below) can be used in both compressor and turbine abradable applications. This is in contrast to prior art coatings, in which different materials are used in compressor and turbine applications to accommodate the different temperature regimes of each.

As used herein, the term "ceramic" refers to inorganic, nonmetallic materials. Ceramics are typically crystalline in nature and are compounds formed between metallic and non-metallic elements such as aluminum and oxygen (alumina-$Al_2O_3$), calcium and oxygen (calcia-CaO), and silicon and nitrogen (silicon nitride-$Si_3N_4$). Examples of suitable ceramics include oxides of aluminum and magnesium such as $Al_2O_3$ and MgO, mullite ($Al_6Si_2O_{13}$), silicon dioxide ($SiO_2$), zirconium dioxide ($ZrO_2$), carbides such as $Ti_3SiC_2$, silicon carbide and tungsten carbide, and nitrides such as boron nitride (BN) and silicon nitride ($Si_3N_4$). Other suitable ceramics include titania, fully or partially stabilized zirconia, multicomponent oxides, including titanates, silicates, phosphates, spinels, perovskites, machinable ceramics (e.g. Corning Macor™) and combinations thereof.

In one embodiment the ceramic can be stabilized zirconia. Methods of forming stabilized $ZrO_2$ powders are known to one skilled in the art. Suitable methods include conventional methods such as spray drying, spray drying and densifying, spray drying with sintering and fused/crushed techniques. Zirconia ($ZrO_2$) can be fully or partially stabilized with an oxide of an alkaline earth metal such as beryllium, magnesium, calcium, strontium, barium, radium; oxides of rare earth elements in the lanthanide series of the periodic table, including, but not limited to, cerium, europium, gadolinium, ytterbium, and other elements in this series; and transition metals in groups 3-12 of the periodic table, such as titanium, yttrium, tantalum, rhenium, indium, niobium, and the like. Combinations of any of these oxides can also be used. In one embodiment the zirconia is stabilized with yttrium oxide. The zirconia is preferably stabilized with yttria in the range of between about 4-25% by weight, more preferably between about 6-10% and most preferably about 7-8%.

Typically, the abradable ceramic coating composition comprises 5-75 wt. % strontium titanate and 25-95 wt. % ceramic, more typically 40-60% SrTiO and 40-60% ceramic, based on the weight of the coating composition.

In one embodiment, the coating composition of the present invention is prepared as a powder. In this embodiment, the strontium titanate will have a particle size of 1-120 micrometers, more typically a particle size of 20-75 micrometers. Also in this embodiment, the ceramic will typically have a particle size of 10-120 micrometers, more typically 45-80 micrometers. Care must be taken to ensure that the particle size of the host ceramic is not too different from the particle size of the SrTiO, to provide the desired blending compatibility, melting point and thermal conductivity.

In an additional aspect, the coating composition of the present invention comprises SrTiO and one or more metals and/or metal alloys. As used herein, the terms "abradable metal" or "abradable metal coat" will refer to SrTiO in combination with a metal or metal alloy. An abradable metal coat may be used to provide resistance to oxidative conditions encountered during service conditions, or enhance the adhesive properties of a thermal barrier coating. The SrTiO is as described above under the description of abradable ceramic coatings.

An example of a suitable metal alloy for use in an abradable metal coat of the present invention is an MCrAlX metal alloy, where M is nickel, cobalt, or iron (either alone or in combination), Cr is chromium, Al is aluminum, and X is lanthanum, hafnium, zirconium, yttrium, tantalum, rhenium or silicon. If X is yttrium, the bond coat is referred to as a MCrAlY bond coat. MCrAlX coatings are well known in the art, and any MCrAlX metal alloy can used in the bond coat of the present invention. Examples of specific MCrAlX coatings such as FeCrAlY as described in U.S. Pat. Nos. 3,528,861 and 3,542,530; composite coatings in which a layer of chromium is applied to a substrate prior to the deposition of a MCrAlY coating; CoCrAlY overlay coatings as describe in U.S. Pat. No. 3,676,085; and NiCoCrAlY overlay coating having particularly high ductility disclosed in U.S. Pat. No. 3,754,903. In one embodiment, the composition comprises SrTiO in combination with NiCoCrAlY.

Other examples of suitable metal alloys include NiCr, nickel aluminide or other nickel-based alloys, and copper-based materials such as spinodal copper. In one embodiment, the composition comprises SrTiO in combination with NiCr.

The abradable metal composition comprises 40-90 wt. % strontium titanate and 10-60 wt. % metal and/or metal alloy, based on the weight of the coating composition. More preferably, the abradable metal composition comprises 70-80 wt. % strontium titanate and 25-30 wt. % metal or metal alloy. The particle size for the metal and/or metal alloy is typically between 1 and 125 micrometers, more typically between 45-110 micrometers. The abradable metal coat may be applied on a substrate to a thickness between about 10 mils (0.254 mm) and about 500 mils (0. 12.7 mm). Preferably the thickness is between about 25 mils (0. 0.635 mm) and about 50 mils (0. 1.27 mm).

The density of the coating of the invention approaches theoretical density, and preferably is above about 90% of theoretical density, approaching 100% of theoretical density. It is important that an allowance of 3 to 10% porosity be incorporated in the coating to allow for abraded dross to escape during the abrading action to keep the material from building up at the seal-blade interface, that may cause "plowing" of the abradable coating at subsequent welding of material to the blade tip, or "chunking out" of the abradable coating. Theoretical density of porous materials is determined by processes well known in the art, such as mercury porosimetry. Theoretical density may also be accurately approximated by conducting a comparative visual analysis with standard photomicrographs of coatings or materials of known densities. The porosity of the coating can be easily determined by microscopic evaluation of coating cross sections. The desired porosity level in a coating application can be set by adjusting the spray parameters of the thermal spray process, and can be tailored to achieve the desired amount of abradability to suit a specific application, such as blade tip material (Ti, or nickel based super alloy, tip hardened or not, and the like).

The coating compositions of the present invention may be applied directly on a substrate, in the case of an abradable metal coat, or alternatively, over a bond coat, as in the case of an abradable ceramic. As will be understood by one skilled in the art, the coating compositions of the present invention can be used alone or in combination with each other or with other suitable bond coats and/or thermal barrier coatings, as desired.

The coating compositions of the present invention are produced by mechanically mixing the SrTiO powder with the metal or the ceramic powders, the individual powders having the particle sizes described above.

To form an abradable seal assembly in accordance with the present invention, the above described powder materials are thermally sprayed onto a substrate such as a compressor casing or stator or turbine shroud to form an abradable seal coating.

Thermal spraying involves the softening or melting of a heat fusible metal component material by heat and propelling the softened or melted material in particulate form against a surface to be coated. The heated particles strike the surface where they are cooled and bonded thereto. A conventional thermal spray gun may be used for the purpose of the both heating and propelling the particles.

A thermal spray gun normally utilizes a combustion or plasma or electric arc to produce the heat for melting of the powder particles. In a powder type combustion thermal spray gun, the carrier gas, which entrains and transports the powder, is typically an inert gas such as argon. In a plasma spray gun, the primary plasma gas is generally argon or nitrogen. Hydrogen or helium is usually added to the primary plasma gas, and the carrier gas is generally the same as the primary plasma gas. Other thermal spray methods could also be used. A good general description of thermal spraying is provided in U.S. Pat. No. 5,049,450.

Suitable thermal spray techniques include, but are not limited to, plasma flame spraying in natural atmosphere (APS); plasma spraying in a controlled atmosphere such as an inert gas, known as Controlled Atmosphere Plasma Spraying (CAPS), plasma spraying in a partial or complete vacuum known as Vacuum Plasma Spraying (VPS). Combustion thermal spray processes including conventional combustion flame spraying, high velocity oxy fuel (HVOF) spraying; and high velocity oxy air (HVAF). Other thermal spray methods include electric arc thermal spray processes. A preferred method is plasma spraying using an inert atmosphere such as argon or nitrogen gas, with a secondary gas such as hydrogen or helium to increase plasma gas enthalpy.

Spraying may be effected on any surface or substrate such as carbon steel, stainless steel, aluminum and alloys of aluminum, copper and alloys of copper, nickel and alloys of nickel, cobalt alloys, titanium and alloys of titanium. Although the substrate material normally comprises metals, other materials may be used including for example, plastics, oxide ceramics and fiber reinforced composite materials. The surface is normally cleaned and roughened to achieve bonding of the coating. In the case of metal substrates roughening of the surface may be achieved by grit blasting. Preheating of the substrate surface to about 250°-350° to remove any surface moisture, oil, etc. and to better match the subsequent thermal spraying heat input is recommended. However, overheating the substrate can cause mismatches due to the coating and substrate coefficients of thermal conductivity resulting in thermal stresses and subsequent debonding of the coating.

As will be understood by one skilled in the art, plasma spray parameters which can be varied to adjust the density of the abradable coating include the powder flow rate and plasma current. A lower powder flow rate and higher plasma current will result in a higher density seal because the powder particles are heated to a higher temperature.

The coating compositions of the present invention, when deposited on substrates used in a gas turbine engine environment, will provide abradable coatings that survive in very high temperature environments, such as in compressors, where temperatures range up to 950° C., or in turbines, where temperatures can range up to 1200°-1300° C. Typically, the SrTiO and ceramic coating will provide excellent properties such as erosion resistance and low thermal conductivity at temperatures up to 1300° C., while the coatings with SrTiO and a metal and/or metal alloy will provide excellent properties at temperatures up to 950° C. Coatings of the present invention help protect metal portions of the turbine due to their low thermal conductivity, erosion resistance and structural stability.

In an additional aspect, the coating compositions of the present invention can be agglomerated by means of electrostatic attraction and/or the use of a binder to adhere the particles together. Agglomerated particles are sometimes desirable for transport, storage and processing, including thermal spraying, of the mixed materials, to prevent settling and undesirable separation. In addition, the desired particle size can be achieved through agglomeration, by agglomerating submicron through micron sized powder.

As used herein, the term "binder" means any substance that will agglomerate the ceramic and metal powders. Standard binders are known in the art, and include, for example, lacquers, water-based binders and solvent-based binders. Examples of specific organic binders include, but are not limited to, vinyl polymers such as polyvinyl and vinyl copolymers, for example polyvinyl chloride, polyvinyl acetate, polyvinyl alcohol, polyvinyl formal, polyvinyl butyral, polyvinyl fluoride, polyvinylidene chloride and polyvinylidene fluoride. Also included is polystyrene including polyparamethylstyrene, butadiene-styrene, styrene-acrylonitride and styrene-maleic anhydride resins. Preferred are polyvinyl acetate and polyvinyl alcohol.

The binders used in the present invention do not go into the sprayed coating, as they are burned off during thermal spraying. Thus, the binders used in the present invention are not "fugitive" materials, as that term is known in the art, which are used to create porosity.

The compositions of the present invention can be agglomerated by using standard spray-dry technology. Typically, a binder is added to a mixture of the particles in a solvent. For ceramic+ceramic or ceramic+metal mixtures, preferred binders are PVA (polyvinyl acetate) or PVOH (polyvinyl alcohol, also called PVA) and the solvent is water. The mixture is either spray dried or the water is evaporated while being mechanically mixed. This drives off the solvent, water and by adjusting the parameters, different sizes of agglomerates can be made.

Alternatively, aggolomeration can be accomplished as follows. The SrTiO and ceramic or metal powders are blended together in the desired ratio and placed in a mixer, such as a Hobart mixer fitted with a heated jacket around the mixing bowl and a vacuum source. A weighted amount of organic binder, usually amounting to 2 to 7% of the blended powder is dissolved in a suitable liquid solvent, usually water, alcohol, naphtha, or other suitable solvent, depending on the binder, making the solution about 10 to 40% of dissolved organic, and added to the SrTiO/ceramic or metal mixture by standard methods to achieve a damp mixture. The damp mixture is heated and, with continued agitation a vacuum is drawn on the mixture. Heating at a temperature between 150° C. to 350° C. continues for sufficient time to drive off the solvent, usually 130 minutes to one and a half hours. The material is then allowed to cool while agitation continues. The heat source, steam or heated oil, can be exchanged to a cold solution to assist in cooling. After about 1 to 2 hours, when the temperature is between 40° C. to 80° C., it can be emptied into drying/curing pans and placed in an oven to allow curing of the binder. The curing process is usually at 100° C. to 150° C. for 4 to 8 hours. The resultant composite is deagglomerated through a granulator and screened to an appropriate size to meet the thermal spray requirements, usually 20 to 150 microns.

In an additional aspect, the coatings of the present invention can be applied by use of a cored wire. Cored wire is usually a thin metal tube filled with metal or ceramic powder. This technique can incorporate metals, ceramics or other powders within a wire for thermal spray or welding application. Plastic can also be used as a binder to contain metal or ceramic powders. The plastic containing. powders are then extruded as a wire, as is known in the art, and processed by thermal spraying in a combustion-type gun, by arc spraying, or as the feedstock in a conventional arc-plasma gun. In one embodiment, the SrTiO and ceramic and/or metal powders are combined with a plastic binder and extruded. SrTiO can also be used alone with the plastic binder.

In one embodiment, pellets of the SrTiO and ceramic or metal/metal alloy can be used to fill an aluminum pipe. The pipe is swaged to the desired size, and the resulting wire is used as feedstock in the thermal spraying method.

In another embodiment, the SrTiO powder is enclosed in a metal tube of NiCr, MCrAlY or other nickel or cobalt alloy; alternatively, the SrTiO powder and the ceramic or metal powder are mixed together and enclosed in a metal tube.

In a preferred embodiment, SrTiO+metal powder is placed on a nickel-alloy strip and the strip is formed into a tube by conventional roll forming techniques. The powders are the cores of this wire. Numerous companies commercially perform this fabrication. The wire is then processed by thermal spraying in a combustion-type gun, by arc spraying, or as the feedstock in a conventional arc-plasma gun. The advantages of cored wire are the ability to use an expanded variety of thermal spraying devices to apply the abradable coating and the use of wire instead of powder. As used herein, the term "cored wire" will refer to metal, metal alloy and plastic cored wires used to contain the powder compositions of the present invention.

EXAMPLES

The following examples are intended to illustrate the invention and should not be construed as limiting the invention in any way.

Example 1

Figure 2:
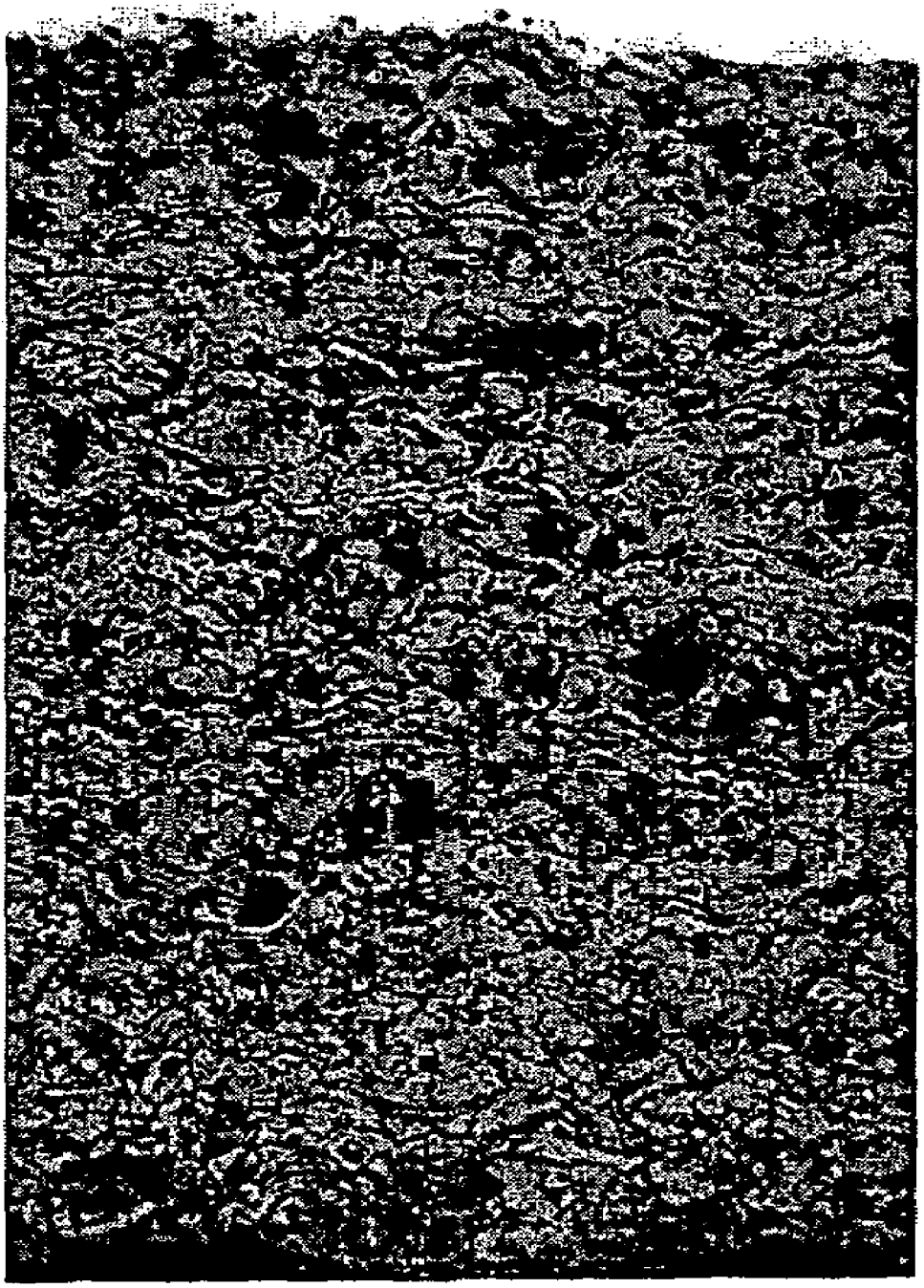
FIG. 2 is a micrograph of as-sprayed SrTiO and yttria-stabilized zircoma.
Figure 3:
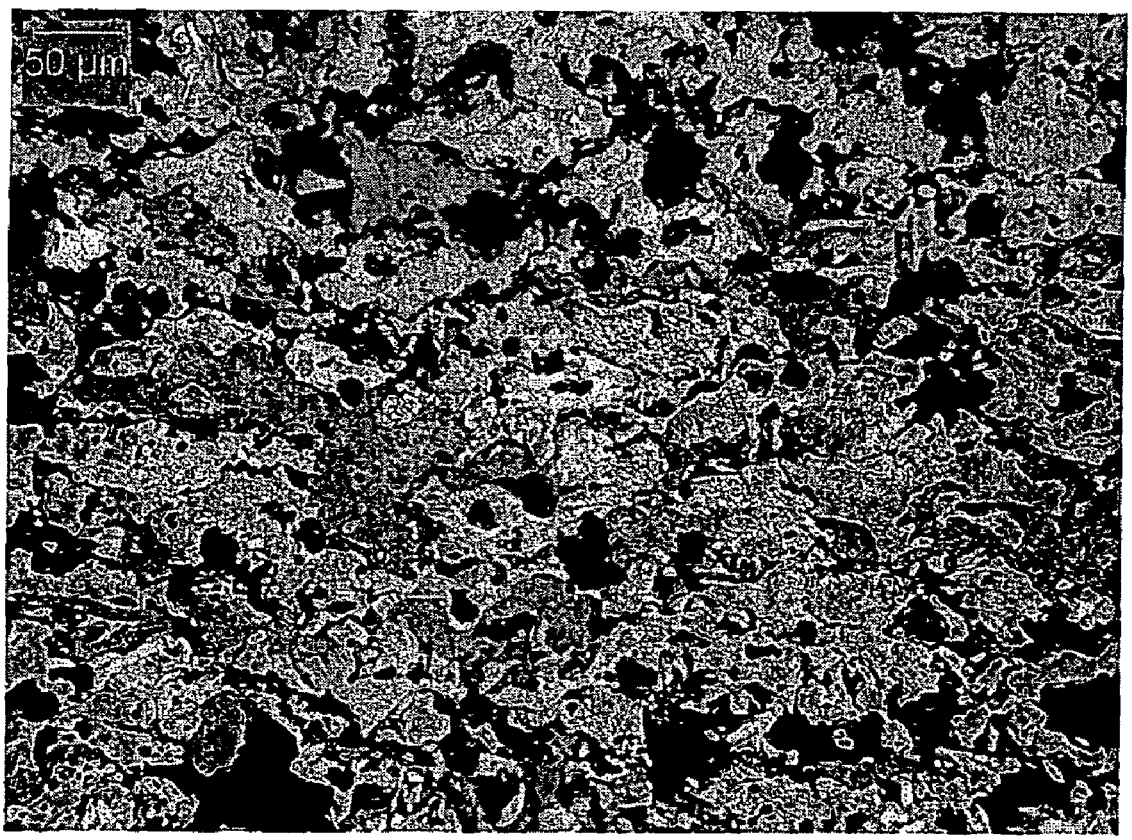
FIG. 3 is a micrograph of as-sprayed SrTiO and NiCrAlY.
Figure 4:
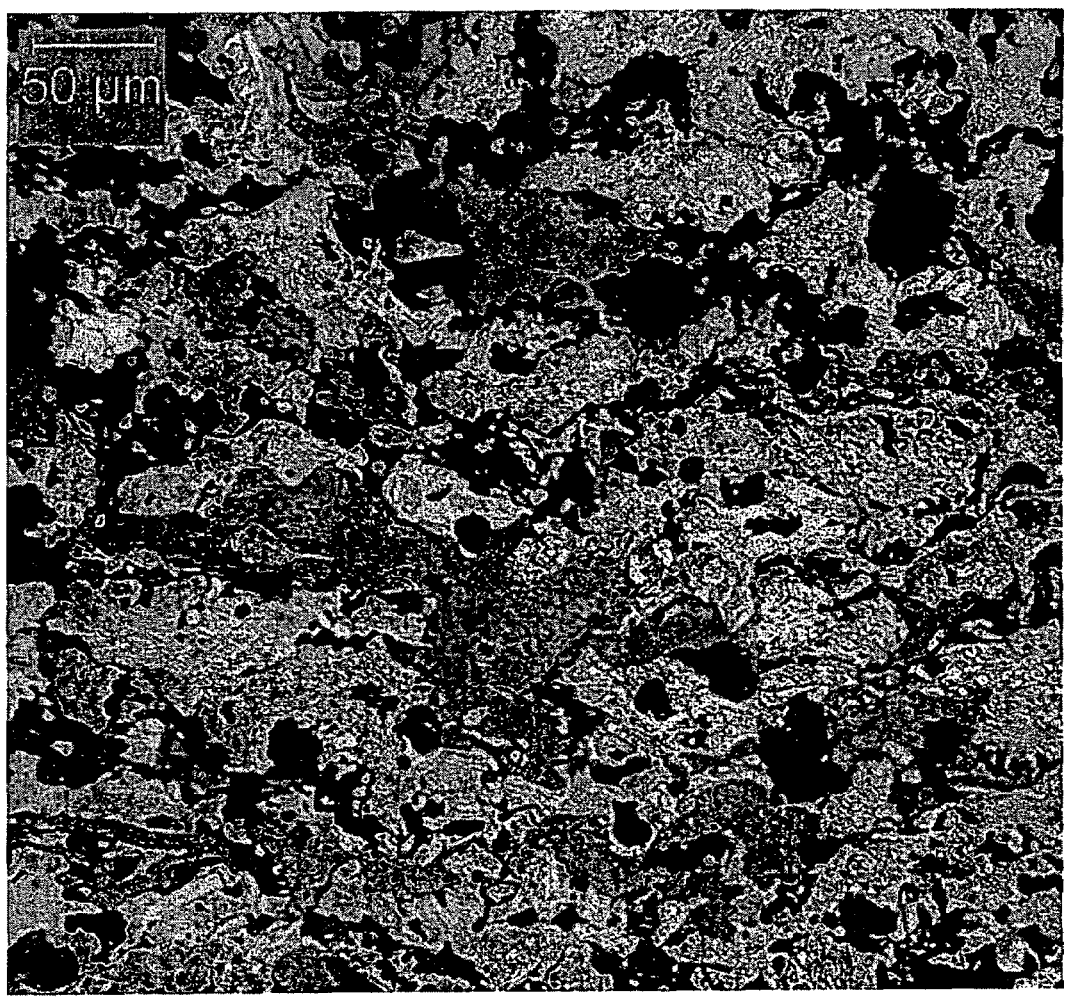
FIG. 4 is a micrograph of as-sprayed SrTiO and NiCr.

SrTiO and yttria-stabilized zirconia compositions were blended in ratios ranging from 7% -75% SrTiO and the remainder partially stabilized yttria zirconia. The powders were mixed in a container on a ball milling machine or in a V-blender (machines available from multiple sources) for 20 minutes and then deposited on a substrate (of 1018 alloy steel or 316 stainless steel) using plasma spray techniques with the parameters set forth in Table 1 below. Samples were tested in an abradable rig. Several blade interaction parameters were used. The blades were a high speed steel, 0.125 inches wide on an eight inch wheel turning at 4000, 6000 and 8000 RPM with an interaction rate of 0.1 mils/sec (0.001 inches/sec) and 10 mils/sec (0.010 inches/sec) for each RPM setting. Hardness, bond strength and other properties for each of the blends are presented in Table 2 below. FIGS. 2, 3 and 4 are micrographs of the as sprayed compositions.

TABLE 1

| SrTiO + ZY-7 Spray Parameter Table | |
|---|---|
| Material | Zirconia/7% Yttria + SrTiO |
| Gun Setup | |
| Gun Type | Metco 3MB |
| Nozzle | GH |
| Powder Port | Number 2 |
| Gasses | |
| Primary | Argon |
| Supply Pressure (PSI) | 150 |
| Flow (SCFH) | 90 to 100 |
| Secondary | |
| Supply Pressure | 75 |
| Flow (SCFH), (See notes) | 15 |
| Power | |
| Amperage (amperes) | 500 |
| Voltage (volts), (See notes) | 60 |
| Powder Feed | |
| Feeder Type | PlasmaTechnic Twin 10C, Metco 3MP/4MP |
| Powder Feeder Gas | Argon |
| Carrier Flow (SLPM) | 5.5 |
| Feed Rate (lb/hr) | 6 |
| Air Jets | |
| Configuration | None |
| Pressure (PSI) | |
| Spray Distance (Inches) | 4 to 5 |

Note:
voltage was adjusted by varying the secondary gas

TABLE 2

| Composition | Coefficient of Thermal Expansion | Thermal Conductivity | Surface Hardness |
|---|---|---|---|
| 50% SrTiO + 50% ZrY-7 | 11.3 ppm | 4.6 W/(m °K)* | Rc 25-35 |
| 75% SrTiO + 25% MCrAlY | 13.8 ppm | 5.8 W/(m °K)* | Rc 35-45 |
| 75% SrTiO + 25% NiCr | 14.6 ppm | 6.1 W/(m °K)* | Rc 32-45 |

*at 900 degrees

Thermal Conductivity Tests

ASTM C 1113 "Hot wire test" was used to determine the thermal conductivity. The results were checked using ASTM C117 "Guarded Hot Plate" on several samples.

Coefficient of Thermal Expansion (CTE)

The coefficient of thermal expansion was determined in accordance with ASTM E-228, Thermal Dilatometric Analysis (TDA) from room temperature through the operating temperature or to 1000° C.

Hardness Tests

Hardnesses were determined by using a superficial hardness tester with a diamond indenter. These hardnesses were converted to bulk hardness values using the tables supplied by the manufacturer, Rockwell. The table is available from several sources, including the internet and is called "Equivalent Hardness Conversion Table".

The test used an "N" Diamond Cone indenter in the HR 15 N scale which has a minor load of 3 kgf and major load of 12 kgf for a total load of 15 kgf.

Example 2

SrTiO and MCrAlY or NiCr compositions were blended in ratios ranging from 5-50% MCrAlY or NiCr and the remainder SrTiO. The powders were mixed in a container on a ball milling machine or in a V-blender for 20 minutes. The compositions were then deposited on a substrate of mild steel (1018 alloy steel or 316 stainless steel) using plasma spray techniques with the parameters set forth in Table 2 below. Samples were tested in an abradable rig. Several blade interaction parameters were used. The blade was high speed steel (0.125 inches wide) on an eight inch wheel turning at 4000, 6000 and 8000 RPM with an interaction rate of 0.1 mils/sec (0.001 inches/sec) and 10 mils/sec (0.010 inches/sec) for each RPM setting. Hardness, bond strength and other properties for each of the blends are presented in Table 2 above.

TABLE 3

| SrTiO + MCrAlY Spray Parameter Table | |
|---|---|
| Material | SrTiO + McrAlY |
| Gun Setup | |
| Gun Type | Metco 3MB |
| Nozzle | GH |
| Powder Port | Number 2 |
| Gasses | |
| Primary | Argon |
| Supply Pressure (PSI) | 150 |
| Flow (SCFH) | 80 |
| Secondary | |
| Supply Pressure | 75 |
| Flow (SCFH), (See notes) | 10 to 15 |
| Power | |
| Amperage (amperes) | 500 |
| Voltage (volts), (See notes) | 65 |
| Powder Feed | |
| Feeder Type | PlasmaTechnic Twin 10C, Metco 3MP/4MP |
| Powder Feeder Gas | Argon |
| Carrier Flow (SLPM) | 5.0 |
| Feed Rate (lb/hr) | 6 |
| Air Jets | |
| Configuration | None |
| Pressure (PSI) | |
| Spray Distance (Inches) | 4 |

These parameters can also be used with 75% SrTiO + 25% NiCr mechanical mixtures.

Whereas particular embodiments of this invention have been described above for purposes of illustration, it will be evident to those skilled in the art that numerous variations of the details of the present invention may be made without departing from the invention as defined in the appended claims.

What is claimed is:

1. A powder coating composition comprising strontium titanium oxide and a ceramic, wherein the strontium titanium oxide comprises 25-60 wt. % $Sr_2TiO_4$ and 40-75 wt. % $Sr_3Ti_2O_7$.

2. The powder coating of claim 1, wherein the strontium titanium oxide is a crystal.

3. The powder coating of claim 1, wherein the strontium titanium oxide has a particle size of 1-120 micrometers.

4. The powder coating of claim 1, wherein the ceramic has a particle size of 10-120 micrometers.

5. The powder coating of claim 1, wherein the strontium titanium oxide and/or ceramic particles are agglomerations of submicron though micron sized powder.

6. The powder coating of claim 1, wherein the composition comprises 5-75 wt. % strontium titanium oxide and 25-95 wt. % ceramic, based on the weight of the coating composition.

7. The powder coating of claim 1, wherein the ceramic is stabilized zirconia.

8. The powder coating of claim 7, wherein the zirconia is stabilized with a compound selected from the group consisting of yttria, ceria, calcia, magnesia and mixtures thereof.

9. The powder coating of claim 1, wherein the ceramic comprises a component selected from the group consisting of alumina, calcia, silicon nitride, magnesia, mullite, silicon dioxide, zirconium dioxide, silicon carbide, tungsten carbide, boron nitride and mixtures thereof.

10. The powder coating of claim 1, further comprising a binder.

11. A powder coating composition comprising strontium titanium oxide and one or more metals and/or metal alloys, wherein the strontium titanium oxide comprises 25-60 wt. % $Sr_9TiO_4$ and 40-75 wt. % $Sr_3Ti_2O_7$.

12. The powder coating of claim 11, wherein the strontium titanium oxide has a particle size of 15-120 micrometers.

13. The powder coating of claim 11, wherein the particle size of the metal and/or metal alloy 1-125 micrometers.

14. The powder coating of claim 11, wherein the strontium titanium oxide and/or metal/metal alloy particles are agglomerations of submicron though micron sized powder.

15. The powder coating of claim 11, wherein the composition comprises 40-90 wt. % strontium titanium oxide and 10-60 wt. % metal and/or metal alloy, based on the weight of the coating composition.

16. The powder coating of claim 11, wherein the composition comprises a metal alloy and the metal alloy is NiCr.

17. The powder coating of claim 11, wherein composition comprises a metal alloy and the metal alloy is MCrAlX.

18. The powder coating of claim 17, wherein the MCrAlX is NiCoCrAlY.

19. The powder coating of claim 11, further comprising a ceramic selected from the group consisting of alumina, calcia, silicon nitride, magnesia, mullite, silicon dioxide, zirconium dioxide, silicon carbide, tungsten carbide, boron nitride and mixtures thereof.

20. The powder coating of claim 11, further comprising a binder.

21. A metal article having a coating comprising the coating composition of claim 1.

22. A metal article having a coating comprising the coating composition of claim 11.

23. An abradable seal assembly comprising: a substrate; and an abradable seal coating deposited on the substrate by thermal spraying, the abradable seal coating comprising i) strontium titanium oxide and a ceramic or ii) strontium titanium oxide and a metal and/or metal alloy, wherein the strontium titanium oxide comprises 25-60 wt. % $Sr_2TiO_4$ and 40-75 wt. % $Sr_3Ti_2O_7$.

24. The abradable seal assembly of claim 23, wherein the assembly is located in the compressor section and/or the turbine section of a gas turbine engine.

25. A cored wire containing the powder coating composition of claim 1.

26. A cored wire containing the powder coating composition of claim 11.

* * * * *